July 1, 1952  E. B. ANDERSON  2,601,925

OIL FILTER

Filed May 22, 1948

INVENTOR,
E. B. Anderson.
BY Sterling P. Buck,
ATTORNEY.

Patented July 1, 1952

2,601,925

UNITED STATES PATENT OFFICE 2,601,925

OIL FILTER

Edward B. Anderson, Baltimore, Md.

Application May 22, 1948, Serial No. 28,611

1 Claim. (Cl. 210—183)

This invention relates to filters, especially to oil filters, and though it is designed especially for use as an element of the circulating system that conducts oil and refrigerant in air-cooling and refrigerating apparatuses, it is useful in various lubricating systems wherein the oil accumulates particles of metal or other solid or abrasive material in circulation.

Another object is to provide, as an easily attachable and detachable unit, a filtering combination especially applicable as an element of the low side of a circulating system in various forms of mechanical or electro-mechanical refrigerators.

Another object is to provide a filtering combination that includes an outer container and an inner container each having a removable upper end for obtaining easy access to the mass of filtering material so as to remove and replace the latter when it becomes detrimentally impregnated with solid matter.

Other objects and important features are pointed out or implied in the following details of description, in connection with the accompanying drawings in which.

Referring to these drawings in detail: Similar reference numerals refer to similar parts in the several views, and the invention is described in detail as follows.

Figure 1:
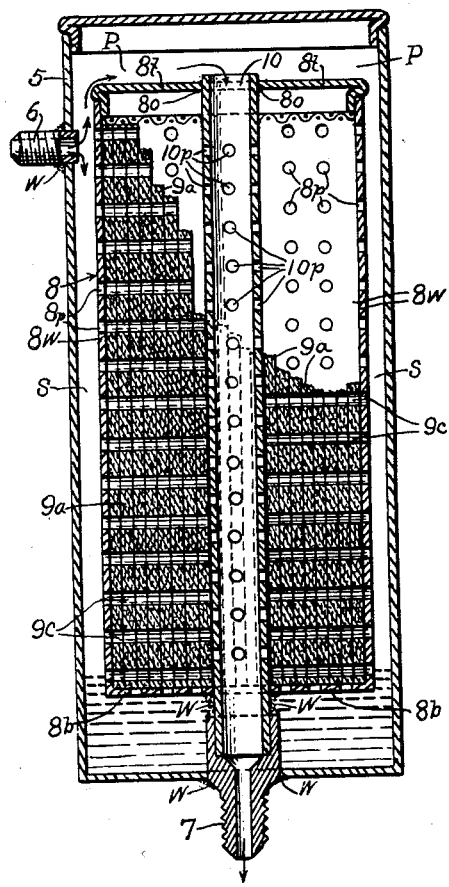
Fig. 1 is a central vertical sectional view of the form designed for the low side of a refrigeration system, the upper right part of the filtering material being omitted to disclose the perforate far wall.
Figure 2:
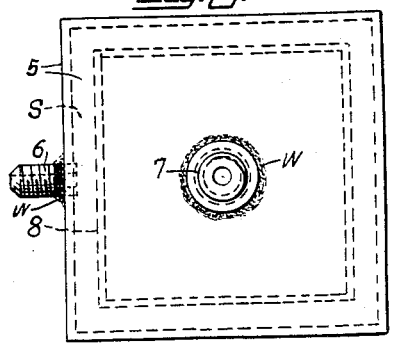
Fig. 2 is a bottom plan view of the form shown in Fig. 1.

In broad terms, the invention is a combination of an outer container 5 having upper and lower end-portions provided with tubular pipe connections 6 and 7 applicable for intercommunication with pipes (not shown) of liquid and gaseous circulating systems; an inner container 8 within the outer container and spaced from the inner surfaces of the latter and having perforate upright walls 8w some of whose perforations are shown at 8p, and some being hidden by the filtering material 9a; and the inner container having a lower wall or bottom 8b that is primarily apertured and in open communication with said lower pipe-connection and interior of said inner container to permit fluid to pass to or from said filtering material through said pipe-connection.

More specifically, the invention comprises an upright tube 10 having its lower end-portion extending through a central opening of the primarily apertured lower wall or floor 8b and united with said floor by any appropriate means, for instance welding such as indicated at w in several places throughout the drawings. The upright tube 10 has perforate sides, as at 10p and the upper end of tube 10 is fitted and secured in the opening 8o at center of the top or plate 8t whose eccentric parts are imperforate and impervious to oil and gas and is separated from the top of the outer container 5 by a passage P. The space S is in open communication with the passage P and with the upper end of the tube 10; so any gas that rises from the inlet pipe 6 has free and continually unhindered flow through the space S, passage P and tube 10 to the outlet-element 7. The pipe-connection 6 is slightly below the top 8t of container 8 and communicates directly with the continuous space S in such relation that when oil and gas enter the space S from the inlet pipe-connection 6, the oil drops to the bottom part of the container 5 where it accumulates and settles and rises into contact with the perforated bottom 8b and sides or walls 8w, thence enters the filtering material 9a which filters it and passes the filtered oil into the upright tube 10 while the gas enters passage P and enters thence into the upper end of tube 10 and passes therefrom, with the filtered oil, out through the pipe-connection 7 of the low side of a circulating system (as shown by the arrows).

The filtering material 9a may be asbestos or other fibrous material in amorphous condition; but the filtering material is here shown as a group of sheets of fibrous material having perforations that register with one another to provide cavities 9c whose inner ends are closed by the outer surface of the upright tube 10. These cavities greatly increase the amount of oil-exposed surface. However, these are only examples of numerous kinds of filtering materials that can be used in these containers; so the invention is not confined to these specific materials, nor to other specific details, for the invention is susceptible of numerous changes within the scope of the inventive ideas as herein implied and claimed.

I claim the following as my invention:

In an oil-filter, the combination of an outer container having upper and lower portions provided respectively with inlet and outlet pipe-connections for intercommunication and cooperation with pipes of an oil-circulating system, an inner container within said outer container having a perforated upright wall considerably spaced from the inner upright surface of said outer container, said inner container having a bottom with a central opening and with perforations around said central opening, an upright tube extending thru and secured in said central opening and being in open communication with said inner container and said outlet pipe-connection, oil-filtering material condensed within said inner container and around said upright tube, the upper one of said pipe-connections being laterally disposed with respect to the space between the walls of the said inner and outer containers and in open communication with said space so oil can flow down therefrom thru said space and onto the bottom of said outer container whence it can rise up to and thru said perforations and thence flow downward and outward thru said upright tube and thru said outlet pipe-connection, said inner container having an upper-end plate that has a central opening in which the upper end of said upright tube is fitted and secured, said plate being imperforate at all points eccentric to the last said central opening and being spaced from the upper end of said outer container and providing a passage that is in open communication with said space and with the upper end of said upright tube, whereby, gas can rise from said space into said passage and thence enter said upright tube where it can flow freely down to and through the lower end of said upright tube.

EDWARD B. ANDERSON.

REFERENCES CITED

The following references are of record in the file of this patent:

UNITED STATES PATENTS

| Number | Name | Date |
| --- | --- | --- |
| 1,930,209 | Milkey | Oct. 10, 1933 |
| 1,941,982 | Gill | Jan. 2, 1934 |
| 2,031,935 | Cuno | Feb. 25, 1936 |
| 2,225,990 | Henry | Dec. 24, 1940 |
| 2,243,949 | Fox | June 3, 1941 |
| 2,339,703 | Kawrath | Jan. 18, 1944 |
| 2,487,146 | Lasky | Nov. 8, 1949 |